United States Patent Office 2,966,797
Patented Jan. 3, 1961

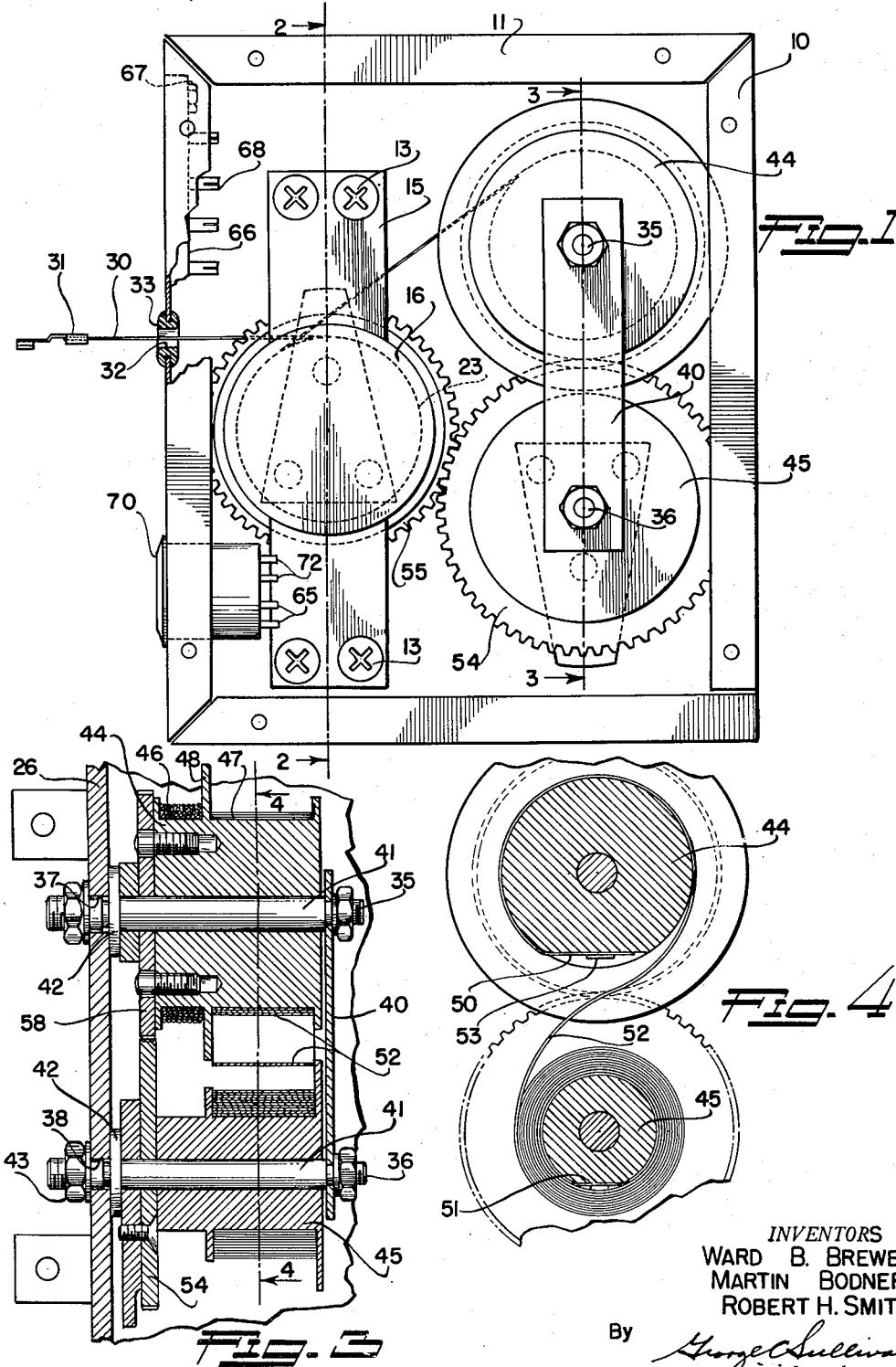

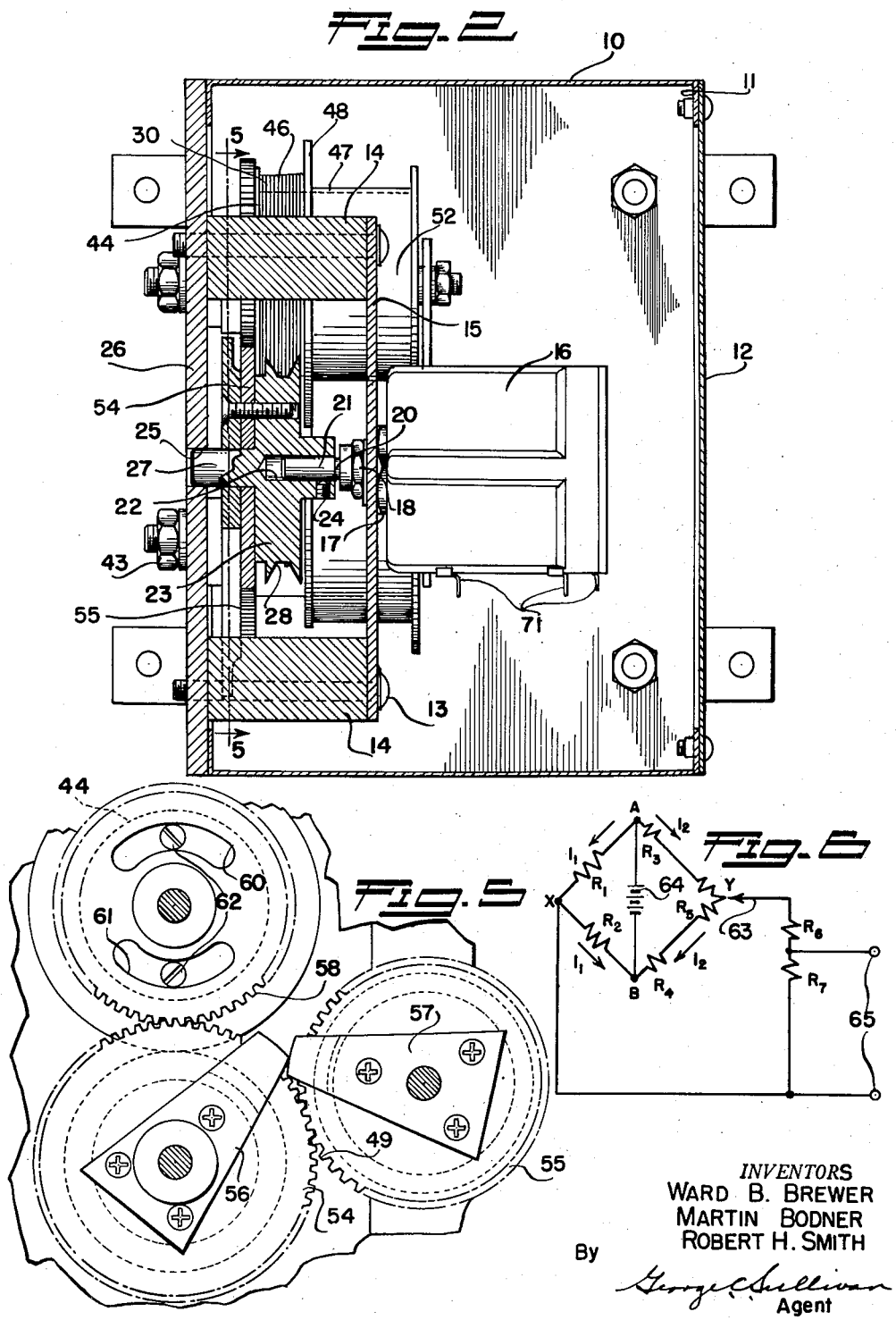

---

2,966,797

ELECTRICAL GAGE FOR MEASURING MECHANICAL DEFLECTIONS

Ward B. Brewer, Burbank, Martin Bodner, Glendale, and Robert H. Smith, Northridge, Calif., assignors to Lockheed Aircraft Corporation, Burbank, Calif.

Filed June 20, 1956, Ser. No. 592,680

4 Claims. (Cl. 73—88.5)

This invention relates to measuring devices and more particularly to an electrical deflection gage for converting a mechanical deflection into an analogue electrical signal which can be measured on electrical indicating or recording equipment.

One of the most critical problems confronting designers of structural elements subject to repeated or recurring loads is the measurement of mechanical deflections and displacement of the structural elements under test conditions. This problem is particularly acute in the design of aircraft parts since without the knowledge of test measurements, the structural elements may be subjected to vibrations and stresses built up to sufficient magnitude in flight to cause failure of the element itself with the ensuing probability of destruction of the aircraft. To alleviate this danger, it has been the practice to subject various aircraft structural elements to wide ranges of loading and, simultaneously therewith, measure the ensuing structural displacement or deflection appearing at different points along the structure. For example, a wing may be subjected to a mechanical vibration slowly varying in intensity while the wing displacement is concurrently being recorded. In the past it has been the practice to employ a series of strain gages selectively placed along the surface of the wing. The voltage output of each strain gage continuously responds to the mechanical deflections appearing at the gages' particular location. The output signals from these gages representing the various deflections would be applied, for example, to an oscilloscope with the resulting images thereof being photographically recorded on film. Then, the resulting recorded oscillations could be visually inspected at the conclusion of the test and the data collected could be employed as raw data for introduction to data reduction equipment such as computers.

When the required range of testing for wing deflection is beyond the physical limits of strain gages, other measuring and transducing means must be employed. One type of wing such as constructed for a trainer type aircraft requires a deflection testing range of .01 inch to 50 inches in order to obtain sufficient test information. In this instance, it is common practice to measure mechanical deflections by employing a scale and transit arrangement for optically sighting the distance between scale readings in accordance with wing deflections. The test information is usually manually recorded and then prepared for introduction into data reduction systems.

Difficulties have been encountered when employing strain gages to measure mechanical deflections which are due in part to their impractical use for wide ranges of deflections. Difficulties encountered when employing a scale and transit arrangement include cumbersome equipments, manpower to manually transcribe and report measurements and the necessary conversion of recorded information into suitable form for data reduction. Furthermore, space limitations and safety do not permit efficient or extensive use of optical measuring arrangements.

These difficulties in sensing and measuring mechanical deflections encountered by presently used methods are readily avoided by the gage of the present invention whereby an electromechanical device is disclosed for producing an output signal of low impedance, the magnitude of which represents a function of the mechanical deflection. For example, the present invention provides a deflection gage comprising a precision linear potentiometer having one end of a spring loaded sensing wire attached to a rotary wiper. The potentiometer is connected in a bridge circuit in such a manner that movement of the sensing wire will be reflected by a commensurate voltage unbalance of the bridge circuit. The unbalanced voltage may now be measured on suitable recording equipment. A feature resides in providing a stop mechanism whereby movement of the sensing wire beyond the physical range of the potentiometer will not cause the rotary wiper arm to break or damage the potentiometer.

The employment of the present invention provides a low impedance sensing gage for generating an electrical voltage proportional to structural deflection. Therefore, it is possible to record these deflections remotely and rapidly in a form suitable for further computation. In this manner, a major saving in manpower and data reduction time is achieved and a marked increase in reliability obtained.

It is an object of the present invention to provide an electrical sensing gage for converting a mechanical deflection into an analogue electrical signal which can be remotely measured by electrical indicating or recording equipment.

It is another object of the present invention to provide an electrical deflection gage employing a rotary type linear potentiometer in an electrical bridge circuit wherein the output from the bridge circuit is linear regardless of the overall change of bridge resistance caused by variations of resistance in the legs or leg of the bridge circuit. In the past it has been extremely difficult to obtain a linear output from a potentiometer included in a bridge circuit because a change of resistance in one leg of the circuit causes a change in the over-all resistance of the bridge circuit and the result is a non-linear output. The device of the present invention includes a potentiometer in the circuit of a balancing bridge circuit in such a manner that the output analogue voltage of the bridge circuit is linear.

It is still another object of the present invention to provide a means for limiting the rotational movement of the rotor of a precision potentiometer so that rotation is restricted at the maximum and minimum physical range of the rotary wiper arm of the precision potentiometer. Without such protection, it is possible that a deflection which would be outside the range of the gage would cause the wiper arm of the precision potentiometer to physically overrun either the lower or upper range of the potentiometer resistance and thereby damage the equipment.

It is another object of the present invention to provide means for limiting the movement of the sensing wire within a selected range without damaging the precision potentiometer or detaching the sensing wire from its anchored connection.

A still further object of the present invention is to provide means for deriving a linear output from a bridge circuit incorporating a variable resistance in the legs thereof whereas previously designed circuits could provide only a non-linear output.

It is a further object of the present invention to provide an electrical circuit having a precision potentiometer which causes a voltage proportional to the unbalance to appear at the output terminals of the gage.

Another object is to provide a means for maintaining a constant torque on the sensing wire. It is desirable to have the same amount of torque placed on the sensing wire over its entire distance of extension.

Another object of the present invention is to provide a low output impedance from a bridge circuit so that the output signal may be transmitted by cable to remotely located data reduction equipments.

These features and objects are described in the following description and shown in the accompanying drawings in which:

Figure 1 is an elevational view of the deflection gage in accordance with the present invention having a side panel removed to show the internal placement of the gage parts;

Figure 2 is a sectional view taken along line 2—2 of Figure 1 illustrating the location of the precision potentiometer and its relationship with a wire pulley;

Figure 3 is a sectional view taken along line 3—3 of Figure 1 showing a pair of wire winding spools and the spring tension means for maintaining a constant tension on the sensing wire;

Figure 4 is a sectional view of the spring tension means taken along line 4—4 of Figure 3;

Figure 5 is a cutaway view taken along line 5—5 of Figure 2 exposing a mechanical means for restricting the travel of the sensing wire beyond the physical limitation of the rotary potentiometer arm; and Figure 6 is a circuit diagram of the bridge circuit incorporating the resistance of the precision potentiometer in accordance with the invention shown in Figure 1.

The deflection gage of the present invention illustrated in Figures 1 and 2, is said to include a case 10 having a plurality of flanges such as flange 11 for receiving a side panel 12. The side panel is not shown in Figure 1 so that parts located within the case may be displayed. Suitably positioned within the case and secured thereto by means of a plurality of screws such as screw 13 is a pair of mountings 14 holding a support 15. The support carries a potentiometer enclosing a precision resistance (not shown) within a case 16 which is secured thereto by means of lock nuts 17 and 18. The potentiometer is of the rotary wiper arm type and therefore has an input shaft 20 extending exteriorly of the potentiometer case. The shaft of the potentiometer carries a sleeve 21 on its end which is insertable in a receptacle 22 provided in a pulley wheel 23. Engagement between the wheel and sleeve 21 is achieved by means of a set screw 24 threadably screwed through the wheel. A bore 25, provided in a base panel 26 of the case, receives an extension 27 integrally formed with the wheel. The bore serves as a bearing surface as the wheel rotates and in cooperation with the shaft, suitably maintains the wheel lying in a plane parallel with respect to the longitudinal axis of the base panel. This construction permits rotational movement of the wheel to be transferred to the potentiometer wiper arm by means of the input shaft. The wheel is provided with the contoured groove 28 extending about the circumference of the wheel.

A sensing wire 30 is employed for attachment to a structural member (not shown) undergoing a test operation. Attachment is accomplished by means of a connector 31 staked to the end of the sensing wire. It should be noted that any suitable means may be employed for attaching the sensing wire to the structural members such as by cementing, taping, hooking etc. The sensing wire extends exteriorly of the case through a hole 32 provided therein. A rubber grommet 33 is employed as a means for protecting the wire from possible damage which might occur if the wire directly engaged the edges of hole 32. The sensing wire is wrapped around the wheel in the groove provided so that movement of the sensing wire will be reflected by rotation of the wheel and thereby rotation of the potentiometer input shaft. The end of the sensing wire opposite the end attachable to the structural member is suitably attached to a collector by a storage means as more clearly shown in Figure 3.

The pair of shafts 35 and 36 are carried on the base panel and extend through holes 37 and 38 provided therein. The pair of shafts are coupled at their ends opposite the ends coupled to the panel base by means of a bar 40 lying in a plane parallel to the longitudinal axis of the panel base. Each shaft is provided with a sleeve 41 having an integrally formed flange portion 42 located adjacent the base panel. When shaft nuts such as nut 43 are tightened the sleeves are firmly secured between the panel base and the bar.

A pair of spools 44 and 45 are associated with each sleeve and are rotated thereon. Spool 44 is divided into two areas 46 and 47 by a flange 48. Area 46 serves as a wire storage area and is arranged with respect to wheel 23 so that as sensing wire 30 is advanced or retracted from the case, spool 44 will rotate to take up or provide additional sensing wire. Area 47 of the spool 44 in cooperation with spool 45 provides a spring tension means for maintaining a constant torque on the sensing wire so that the same amount of tension is placed on the sensing wire regardless of how far the sensing wire has been advanced from its storage area. The spring torque is such that an extended or advanced sensing wire is urged toward the case and to its storage area. As more clearly shown in Figure 4, the spring tension means is provided wherein it can be seen that spring ends 50 and 51 of a spring 52 are attached to spools 44 and 45 respectively. The spring is of a conventional type made of high tension metal such as may be purchased from the Hunter Spring Company of Landsdale, Pennsylvania, under the name "Negator B Motor Spring." The spring is wound in its reverse direction and mounted onto the spools by attaching the spring ends to the spools with screws such as screw 53. It has been found desirable to provide a spring torque of approximately 1.2 pounds per inch. The spools provide storage areas for the spring so that as the spool 44 rotates counter-clockwise, the spring is drawn from area 47 and wrapped around spool 45. Spool 45 rotates in a counter-clockwise direction when the sensing wire is drawn from its storage area 46. When no load is attached to the sensing wire the torque of the spring urges spool 45 to rotate counter-clockwise to retract the sensing wire.

The present invention further contemplates the inclusion of a stopping means for limiting the rotation of the potentiometer input shaft 20 as well as the wire storage spool 44 so that the physical limits of either shaft rotation or storage spool rotation beyond the length of the sensing wire will not be exceeded. To accomplish this function, it is desirable to synchronize the rotation of the spools and the pulley wheel. As shown in Figure 5, the stopping means comprises a pair of differentially operable gears 54 and 55 engageable by means of teeth 49 provided about their circumference. Gears 54 and 55 are associated with spool 45 and wheel 23 resectively and are carried about shaft 36 and extension 27 respectively. A pair of stop arms 56 and 57 are attached to the gears 54 and 55 and rotate therewith when the spool 45 and wheel is actuated. Inasmuch as gear 54 has a larger diameter than gear 55, wheel 23 will rotate a predetermined number of rotations or fractions thereof before the pair of stop arms will engage. Engagement of the stop arms will occur at the predetermined number of rotations regardless of the rotational direction of the gears. Thus, it can be seen that the proper placement of the stop arms on gears 54 and 55 will prohibit the rotation of the spool and pulley wheel so that the exact range of the sensing wire extension and retraction can be controlled. For example, it has been determined that 68 teeth on gear 55 and 76 teeth on gear 54 will permit approximately 9.75 revolutions of gear 55 in either direction before engagement of the stop arms occur. This gear arrangement allows the sensing wire to be extended or retracted from 0 to 50 inches.

A gear 58 is provided so that the rotational movement of the wire storage spool 44 will be in synchronization with the rotation of spool 45 and wheel 23. Gear 58 is carried on the flange of sleeve 41 and is provided with a pair of slots 60 and 61. A pair of screws 62 are inserted through the slots and are threadably engaged with reel 44. The screw and slot arrangement is provided so that the difference in diameter of wire stored may be compensated for different lengths of wire as the wire is unwound or is wound.

Diagrammatically the electrical circuit employed in the present invention is represented in Figure 6 wherein $R_1$ and $R_2$ are fixed resistances comprising two legs of a bridge circuit while fixed resistances $R_3$ and $R_4$ comprise the other two legs of the bridge circuit in combination with $R_5$ which is the variable resistance of the potentiometer. It has been found preferable to employ the following ohmic values for the above resistances:

$R_1, R_2 = 1,000$ ohms
$R_3, R_4 = 100$ ohms
$R_5 = 500$ ohms

Since $R_5$ is a variable resistance and inasmuch as $R_5$ is connected in series between $R_3$ and $R_4$, the ohmic value of the last mentioned bridge legs will vary in accordance with the contact point of wiper arm 63. The wiper arm, in effect, divides $R_5$ so that a portion of $R_5$ is included in the leg represented by $R_3$ and a portion of $R_5$ is included in the leg represented by $R_4$. Although the ohmic value of $R_3$ and $R_4$ (including the above respective portions of $R_5$) may vary inversely in response to displacement of the wiper arm, their combined ohmic value does not vary. This feature of arrangement provides a linear voltage output from the bridge circuit. A current is supplied to the bridge arrangement of the resistances at points A and B from a voltage source 64. A pair of output contacts 65 are placed in the bridge circuit at points X and Y. When the wiper arm is positioned midway between the resistance $R_3$ and $R_4$, no current will flow from points X and Y; that is, there is no voltage difference between the points X and Y since the voltage at each point is the same.

The total current divides at A and flows into the arms of the bridge forming the currents $I_1$ through $R_1$ and $R_2$ and $I_2$ through $R_3$ and $R_4$. If there is no potential difference between points X and Y, the voltage drop across $R_1$ is equal to the voltage drop across $R_3$ including a portion of $R_5$.

When the shaft 20 of the potentiometer is rotated, wiper arm 63 is urged across resistance $R_5$ depending upon the direction of input shaft rotation with the result of inversely varying the value of $R_3$ and $R_4$ (including their respective portions of $R_5$). Such a change of resistance will produce a potential difference between the points X and Y and cause a signal current to flow through the wiper arm proportional to the amount of resistance change. A pair of resistances $R_6$ and $R_7$ are employed as a load resistance. Output terminals 65 are associated with resistances $R_6$ and $R_7$ in such a manner that a low impedance signal is derived. Because of the low impedance output, the signal may be carried by cables to remote equipment for recording. Resistance values of 20,000 ohms and 240 ohms have been found desirable for $R_6$ and $R_7$ respectively.

A terminal board 66 is secured to case 10 by a fastener 67. A plurality of terminals such as terminal 68 are provided to accommodate the resistors (not shown) of the bridge circuit and associated electrical wiring. An electrical receptacle 70 is affixed to the case which serves as a convenient attachment means 72 for the voltage supply 64 which may be remotely located and for the output terminals. Leads 71 of the potentiometer are connected to respective terminals 68 attached to terminal board 66 so that the potentiometer resistance $R_5$ is coupled with the resistance legs $R_3$ and $R_4$.

In actual operation, the deflection gage is placed in the vicinity of a structural member to be tested. Sensing wire 30 is extended from the gage through hole 32 and is suitably attached to the structural member by means of connector 31. As the sensing wire is drawn from the case, additional sensing wire is supplied from storage area 46 as spool 44 rotates counter-clockwise. The rotation of spool 44 acts against the spring tension of spring 52. As the spool 44 rotates, the spring stored on spool 45 is progressively transferred to spool 44 as the sensing wire advances.

As pulley wheel 23 rotates in accordance with the positioning of sensing wire 30, shaft 20 of the precision potentiometer is rotated and thereby positions wiper arm 63 to a new location on resistor $R_5$. The positioning of wiper arm 63 causes an electrical unbalance of the bridge circuit, as previously described, and a signal current proportional to the unbalance is present at output terminals 65.

The pulley wheel and the pair of spools are maintained in synchronization by means of intermeshed teeth 49 carried on the rim of gears 54, 55 and 58. Should the pulley wheel be rotated approximately 9.75 rotations, stop arms 56 and 57 engage to prohibit further rotation and therefore restricts further advancement of the sensing wire.

When the test operation has been completed on the structural member, sensing wire 30 may be disconnected and drawn onto its storage area 46 by the urging of spring 52. As the diameter of storage increases, spool 44 adjusts itself on sleeve 41 to compensate for the increase. Studs 62 in slots 60 and 61 allow spool 44 slippage to compensate for the increase in wire storage diameter.

Having described only a typical form of the invention we do not wish to be limited to the specific details herein set forth, but wish to reserve to ourselves any variations or modifications that may appear to those skilled in the art and fall within the scope of the following claims.

We claim:

1. In a device for detecting mechanical deflections of a test object, the combination comprising, flexible elongated sensing means movable in accordance with mechanical deflections of a test object, a storage spool connected to one end of the sensing means and rotatable by the winding and unwinding action of the sensing means in response to deflections of the test object, torque means connected with the storage spool for maintaining a constant tension load on the sensing means, an electrical current modifying means having a rotatable input shaft responsive to movement of the sensing means, the input shaft being rotatable in the same direction as the storage spool, and differential gear stopping means geared to the storage spool for restricting the movement of the sensing means beyond the connection of the sensing means with the storage spool.

2. A device for generating an electrical signal in response to mechanical deflections, the combination comprising, a case, a sensing wire movable toward and away from the case in response to the mechanical deflections, a storage spool rotatably mounted within the case connected to one end of the sensing wire and rotatable in accordance with the wire movement toward and away from the case, torque means connected to the spool for maintaining a constant torque on the sensing wire, differential gear stopping means for restricting the movement of the sensing wire beyond the connection of the sensing wire with the storage spool, an electrical bridge circuit for generating the electrical signal, a precision potentiometer included in the bridge circuit of variable resistance, pulley wheel means for receiving a single turn of sensing wire and connected to the potentiometer so that its resistance varies in response to sensing wire movement about the pulley wheel means, and a low impedance output network connected in series with the bridge circuit.

3. In a device for detecting mechanical deflections, the combination comprising flexible elongated sensing means responsive to the mechanical deflections, a storage spool connected to one end of the sensing means and rotatable in accordance with the winding and unwinding of the sensing means thereon, spring means biasing the spool for placing a constant tension on the sensing means, a rotatable pulley wheel with one turn of the sensing means, and a signal current modifying means fixed to the pulley wheel responsive to the sensing means and being rotatable in the same direction of rotation as the pulley wheel.

4. In a device for detecting mechanical deflections of a test object, the combination comprising, flexible elongated sensing means movable in response to the deflections of the test object, the pulley wheel with one turn of the sensing means and rotatable by the sensing means responsive to the deflections, a rotatable storage spool connected to one end of the sensing means and adaptable to store the sensing means as the sensing means winds on the storage spool, spring means coupled to the storage spool for rotating the spool to store the sensing means and for placing a constant tension on the sensing means, a potentiometer having an input shaft secured to the pulley wheel to rotate in accordance therewith, and an electrical bridge circuit including the potentiometer adaptable to generate an electrical signal in accordance with sensing means movement via the pulley wheel.

References Cited in the file of this patent

UNITED STATES PATENTS

| | | |
|---|---|---|
| 2,152,556 | Messinger | Mar. 28, 1939 |
| 2,742,780 | Feigal et al. | Apr. 24, 1956 |
| 2,758,474 | McKinney | Aug. 14, 1956 |

FOREIGN PATENTS

| | | |
|---|---|---|
| 740,205 | Germany | Oct. 14, 1943 |